United States Patent [19]

Goldenberg et al.

[11] Patent Number: 4,682,293

[45] Date of Patent: Jul. 21, 1987

[54] AUTOMATIC REGULATING PROCESS AND DEVICE FOR MULTIFUEL INTERNAL COMBUSTION ENGINES

[75] Inventors: Emanuel Goldenberg, Poissy; André Douaud, Puteaux, both of France

[73] Assignee: Institut Francais du Petrole, Rueil-Malmaison, France

[21] Appl. No.: 437,241

[22] Filed: Oct. 28, 1982

[30] Foreign Application Priority Data

Oct. 28, 1981 [FR] France ............................... 81 20372

[51] Int. Cl.[4] .................... F02M 43/00; G06D 11/02; G06F 15/20

[52] U.S. Cl. ............................... 364/431.05; 123/575; 123/417; 123/480; 60/39.06

[58] Field of Search ......... 364/431.01, 431.03-431.05, 364/509, 510, 500, 465, 479, 442; 60/39.06; 123/480, 1 A, 552, 489, 478, 381, 575-578; 235/381

[56] References Cited

U.S. PATENT DOCUMENTS

| | | | |
|---|---|---|---|
| 4,031,864 | 6/1977 | Crothers | 123/575 |
| 4,072,850 | 2/1978 | McGlynn | 364/424 |
| 4,369,736 | 1/1983 | Ito | 123/1 A |
| 4,391,253 | 7/1983 | Ito | 123/480 |
| 4,437,162 | 3/1984 | Kato | 364/509 |

*Primary Examiner*—Felix D. Gruber
*Assistant Examiner*—Thomas G. Black
*Attorney, Agent, or Firm*—Millen & White

[57] ABSTRACT

A process and device is provided for automatically regulating the running conditions of an internal combustion engine. The engine is of the type fed with different fuels, and in accordance with the nature and the composition of the fuel or fuel mixture contained in the feed tank of the engine, at any moment, including that of a new fuel supply at a filling station, the regulator is monitored by a data processing unit delivering signals representative of the amount and the characteristics of the fuel contained in the tank before and after a new fuel supply.

7 Claims, 1 Drawing Figure

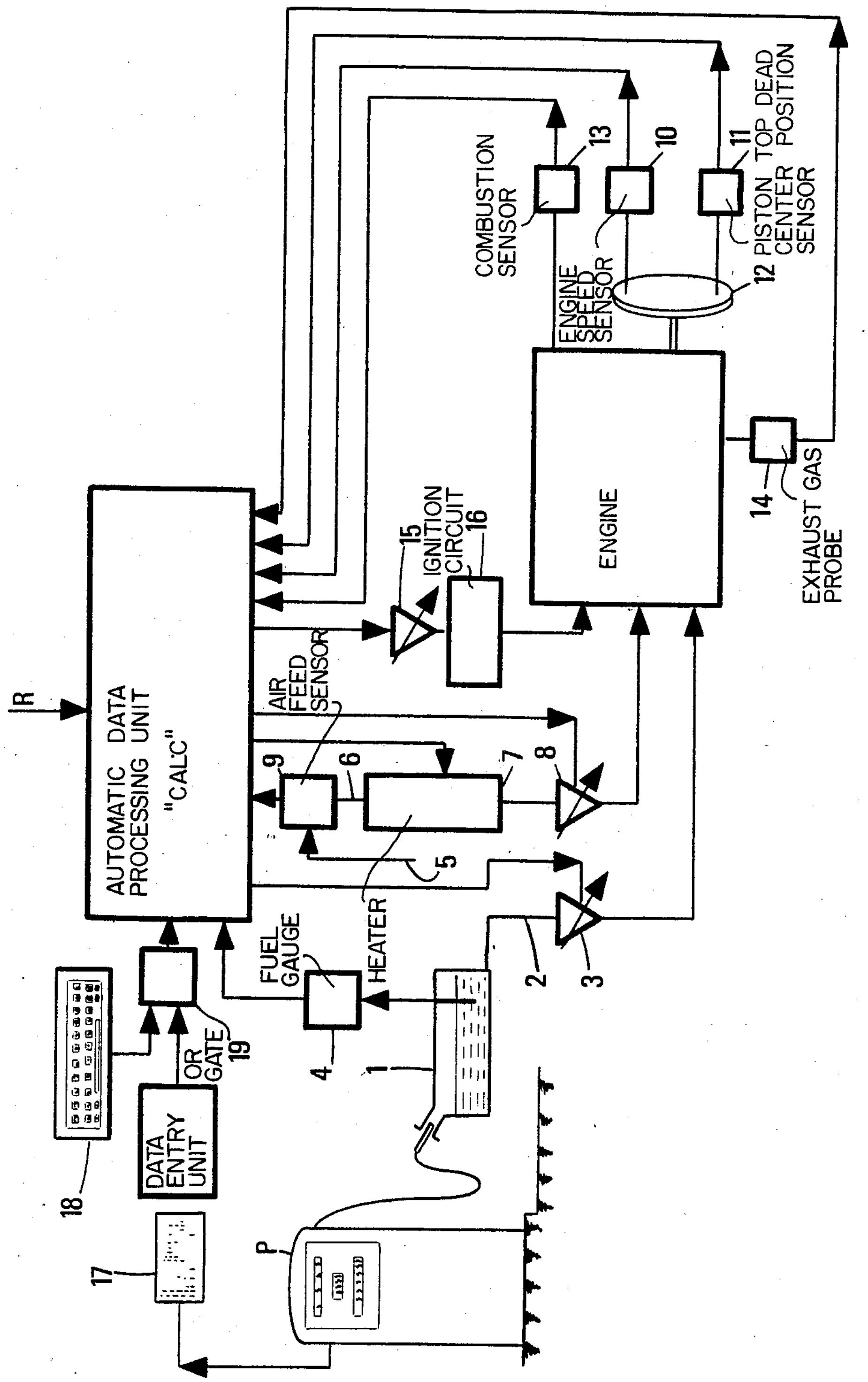
AUTOMATIC DATA PROCESSING UNIT
"CAL'C"
R
AIR FEED SENSOR
9
6
7
8
5
HEATER
FUEL GAUGE
4
1
2
3
15
IGNITION CIRCUIT
16
ENGINE
14
EXHAUST GAS PROBE
ENGINE SPEED SENSOR
COMBUSTION SENSOR
13
10
11
12
PISTON TOP DEAD CENTER POSITION SENSOR
OR GATE
19
DATA ENTRY UNIT
18
17
P

AUTOMATIC REGULATING PROCESS AND DEVICE FOR MULTIFUEL INTERNAL COMBUSTION ENGINES

BACKGROUND OF THE INVENTION

This invention relates to an automatic regulating process and device for multifuel internal combustion engines.

In order to make possible the use of the various types of fuels which will be supplied on the market in the future, engines capable of operating with and fed with multifuels will have to be provided with an internal system for adapting the operation to the various fuels or mixtures of various fuel compositions, on the one hand, and for the automatic regulation of the fuel-air ratio or richness and of the ignition, on the other hand.

SUMMARY OF THE INVENTION

The essential object of the present invention is to comply with these different requirements.

This object is achieved, according to the invention by a process for the automatic regulation of the running conditions of an internal combustion engine. The process comprises at each fuel supply of the feeding tank of the engine, determining with an automatic data processing unit, in relation with the amount and the characteristics of the fuel introduced into the tank and of the amount and characteristics of the fuel already contained in that tank, the characteristics of the resultant fuel mixture, and then adjusting the running conditions of the engine in accordance with the so-determined new characteristics.

A device for carrying out the invention comprises a data processing unit associated with the engine and connected to means for sensing operational parameters of this engine and to means for regulating the operation of the engine. The automatic data processing unit comprises means for introducing data external to the engine and is of the type capable of recording the amount and the characteristics a fuel supplied to the engine feed tank, and is also capable of generating signals for regulating control members controlling the engine running conditions from processing of the data relating to the amount and the characteristics of the fuel supplied to the feed tank, as well as from data representative of the amount and the characteristics of the fuel previously contained in the tank.

The characteristics of the fuel (liquid or liquefied gas) as recorded, may concern, in particular, its composition (proportion gasoline/alcohol or liquefied gas), the stoichiometric air-fuel ratio characterizing the fuel, its specific gravity, its octane number, etc. . .

The invention also relates to the combination of a fuel delivery system for motor vehicles with an automatic data processing unit equipping said vehicles. The delivery system is equipped with means for delivering data concerning the amount and the characteristics of the fuel supplied to each vehicles, in a form adapted to be read by means for introducing the data into the data processing unit. The data processing unit is of the type capable of to generating regulation signals for actuating members controlling the engine running conditions from the data relating to the volume and the characteristics of the fuel supplied to the vehicle.

BRIEF DESCRIPTION OF THE DRAWING

The accompanying drawing illustrates an embodiment of the invention.

DETAILED DISCUSSION OF THE INVENTION

In the FIGURE there is diagrammatically illustrated an example of embodiment of the invention. Reference M designates an engine fed with fuel from tank 1 through pipe 2, provided with an electro-valve 3 for regulating the fuel feed rate. The fuel level in tank 1 is measured by the guage 4. The air supply is effected through the air filter 5 and a pipe 6 passing through a heater 7 provided with an electrovalve 8 for adjusting the air feed rate. This feed rate is measured by sensor 9. Other sensors 10 and 11 co-operating with a flywheel 12, driven in rotation by the engine, respectively determine the running speed of the engine and the instant of passage of the piston through the top dead center in each cylinder at each motorcycle.

A combustion sensor 13 determines abnormal combustion cycles where the knock phenomenon appears.

A probe 14, placed on the way of the exhaust gases, determines when said gases are produced by the combustion of a stoichiometrical fuel-air mixture.

The indications from the above-mentioned different sensors, referred to by letter C in the drawings, are transmitted to an automatic data processing unit (Calc) of the micro-processor type, which delivers regulating signals to electro-valves 3 and 8 and to a member 15 for controlling the ignition circuit 16 of the engine.

The automatic data processing unit (Calc) may be adapted to automatically adjust the ignition advance to an optimum value avoiding the knock occurence, in relation with the received signals, particularly from sensors 10, 11 and 13, for example according to the process described in the U.S. Pat. No. 4,120,272.

According to the present invention, the automatic data processing unit (Calc) is connected to means for introducing data external to the engine, comprising the amount and the characteristics of the fresh fuel supplied to tank 1, said data being introduced at each new supply of fresh fuel to said tank.

These data introduction means, i.e., a data entry unit, designated by letter L in FIG. 1, may consist of a device for reading data carriers, such as magnetic cards or tapes, delivered by the fuel pump at each supply (magnetic card 17 in FIG. 1) and whereon are recorded the volume and the characteristics of the fuel supplied to tank 1, particularly its specific gravity, its volume and its specific stoichiometrical air/fuel ratio, or the volume ratio of two or more constituents thereof, such as gasoline and alcohol.

This data introduction at each supply of tank 1 may be effected in another way without however departing from the scope of the invention. It could be effected, for example, by means of an electric cable connected to the fuel pump and which will be connected for this purpose, for a short time, to the data introduction means, i.e., data entry unit, L of the vehicle equipped with a suitable electric plug, at each fuel supply at the filling station.

The fuel pump may likewise be equipped with a device for transmitting coded informations by ultra-sonic or radio waves, cooperating with a receiver or reader associated with the data processing unit (Calc).

A manually controlled keyboard 18 may also be connected to the data processing unit (Calc) in parallel with the reader L, through an OR gate indicated by reference 19, to cope with any failure in the automatic data introduction system L, whereby data can be manually introduced into the processing unit (Calc) at the time of a new fuel supply to tank 1.

The automatic data processing unit (Calc) may also comprise data introduction circuits concerning the adjustments R, said data being for example worked out during engine bench tests.

Reference will be made more particularly hereinafter, by way of example, to a device according to the invention wherein the data concerning the fuel are introduced by using magnetic cards or tapes.

The device equipping each vehicle then comprises an on-board computer provided with a magnetic card or tape reader, associated with a manual keyboard for data introduction. This arrangement makes possible the acquisition of various data and particularly those of the fuel volume remaining in the tank, by integration of the instantaneous consumption and from indications given by accurate volumetric gauges or gravimetric devices making use of suitable sensors. It controls actuating members for adjusting the richness of the feed mixture and the ignition advance in relation with the type of fuel or other parameters, (knock detection etc. . . . ).

The data introduction will be made automatically, preferably by magnetic card, comprising the anti-theft code of the vehicle.

At the filling station, the fuel supply will not be possible but by introduction of the magnetic card 17 into the device L provided for this purpose. The magnetic recording of the volume and of the type of supplied fuel will be automatically effected on the card. When introducing the card into the reader of the processing unit (Calc), the following operations will take place :

- Reading of card 17
- Validation of this reading resulting in the unlocking of the system controlling the adjustments when the anti-theft code is correct.
- Comparison of the code of the introduced fuel with that of the preceding one, kept in memory.
- When these codes are identical, addition of the new volumes to the remaining ones and memorization.
- When the codes are different, computation of the new type and memorization of the new composition and of the resultant volume.
- Modification of the richness and ignition adjustments after starting and a time delay relative to the dead volume in the tank and the admission of new fuel.
- Deletion record of the volume/fuel type data from the card.

In case of loss of the magnetic card, the introduction of the anti-theft code will be effected manually at 18. A by-pass button on the pump control system may nevertheless allow the tank filling and the delivery of a magnetic ticket 17 to be introduced into the board reader L. In the case of pumps not yet equipped with such systems the user will manually introduce the indications of volume and fuel type code, displayed at the pump, in the board computer, the subsequent operations will then be performed as above.

By way of example, for fuels formed of methanol-gasoline mixtures, if $V_1$ designates the volume of mixture 1 of specific gravity $D_1$ contained in the tank before the supply at the filling station, and if $V_2$ designates the volume of mixture 2 delivered by the pump, $(A/F)_1$ and $(A/F)_2$ being the specific stoichiometrical air-fuel rations of the respective mixtures 1 and 2, the values $V_3$, $D_3$ and $(A/F)_3$ of the resultant mixture 3 obtained in the tank are related to the preceding values by the volumetric relationships:

$$V_1D_1\,(A/F)_1+V_2D_2\,(A/F)_2=V_3D_3\,(A/F)_3 \quad (1)$$

with $$V_1+V_2\simeq V_3 \text{ (to 0.4\% near)} \quad (2)$$

$$\text{and } \frac{V_1\,D_1+V_2\,D_2}{V_1+V_2}\simeq D_3 \quad (3)$$

The automatic data processing unit (Calc) may be adapted to determine, after each fuel supply, the values $(A/F)_3$, $V_3$ and $D_3$ of the resultant mixture 3 by making use of the three above-mentioned relationships (1), (2), and (3), applied to the initial values $(A/F)_1$ $V_1$ and $D_1$ and the values $(A/F)_2$, $V_2$ and $D_2$ specific of the new fuel supply, these values being recorded on the magnetic card 17.

When making use of gravimetry, the respective weights $P_1$, $P_2$ and $P_3$ of mixtures 1, 2 and 3 are measured and the ratio $(A/F)_3$ will be determined by the processing unit (Calc) making use of the following relationships:

$$P_1(A/F)_1+P_2(A/F)_2=P_3(A/F)_3 \quad (4)$$

and $$P_1+P_2=P_3 \quad (5)$$

In order to remove any uncertainty resulting from summing up successive measurement errors, the data processing unit (Calc) will be informed (by transmission of a signal from sensor 4) at each time the tank 1 will be filled completely at 100%, and will then automatically proceed to a correction, if necessary.

From the so-determined value $(A/F)_3$, the processing unit (Calc) delivers electric signals for adjusting electro-valves 3 and 8, respectively controlling the fuel and the air feed rates so as to adapt the ratio of these feed rates to the new values $(A/F)_3$.

What is claimed is:

1. Apparatus for automatically regulating the running conditions of an internal combustion engine connected to a fuel tank, the apparatus comprising:

means for connecting the fuel tank to the engine, the connecting means including only a single fuel line extending between the fuel tank and the engine, the single fuel line having a valve therein, the valve having valve control means associated therewith for controlling flow of fuel through the fuel line;

an automatic data processing unit, the automatic data processing unit including a memory and a plurality of inputs, the inputs being connected to the following outputs:

a fuel level output from a fuel level monitor in the fuel tank;

an output of a fresh fuel data selector such as a card or keyboard which passes data relating to fresh fueling of the tank, the data including the amount of and appropriate stoichiometric air-fuel ratio of the fresh fuel which has filled the tank, the output of the data selector being connected to the memory for storage with data relating to previous fresh fuelings and with the fuel level output so as to provide a current air-fuel ratio for fuel existing in the fuel tank;

outputs from the engine of combustion air feed rate and combustion air temperature sensors;

an output from the engine of an exhaust gas monitor;

an output from the engine of an ignition timer; and an output of a techometer associated with the engine;

the automatic data processing unit including the following output lines;

a control signal line connected to a heater for operating the heater to select the temperature of the combustion air;

a control signal line connected to a combustion air valve for operating the combustion air valve to select the rate at which combustion air flows to the engine:

a control signal line connected to an ignition circuit for controlling the timing of the ignition cicuit of the engine; and a control signal line connected to a valve control means for controlling the valve in the single fuel line to select the rate at which the fuel is delivered to the engine;

whereby:

the outputs of the automatic data processor are a function of the inputs to the data processor including the input of the fresh fuel data corresponding to the amount and type of fuel currently in the tank, and the amount and type of fuel which previously filled the tank.

2. A device according to claim 1, wherein said data selector comprises a data reader for reading in data from a data carrier.

3. A device according to claim 2, wherein said data reader tape reader.

4. A device according to claim 1, wherein said data selector comprises an electric plug for receiving data input, and constructed for being connected to an additional data transmitting unit located at a fuel filling station.

5. A device according to claim 1, wherein said data selector comprises a receiver of coded ultrasonic or radio signals, for receiving said coded ultrasonic or radio signals from a corresponding transmitter at a fuel filling station.

6. A device according to claim 1, which means for causing a predetermined delay between the input of said data concerning a new fuel supplied to tank and the generation of new adjustment signals.

7. A device according to claim 1, further comprising means for validating said data, the validating means being connected with said means for introducing data, thus forming an anti-theft system for the vehicle.

* * * * *